(12) United States Patent
Vaiana et al.

(10) Patent No.: US 11,035,739 B2
(45) Date of Patent: *Jun. 15, 2021

(54) INTEGRATED ELECTRONIC DEVICE COMPRISING A TEMPERATURE SENSOR AND SENSING METHOD

(71) Applicant: STMicroelectronics S.r.l., Agrate Brianza (IT)

(72) Inventors: Michele Vaiana, San Giovanni la Punta (IT); Daniele Casella, Francofonte (IT); Giuseppe Bruno, Paternó (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,819

(22) Filed: Jul. 6, 2020

(65) Prior Publication Data

US 2020/0333197 A1    Oct. 22, 2020

Related U.S. Application Data

(60) Continuation of application No. 16/394,804, filed on Apr. 25, 2019, now Pat. No. 10,739,212, which is a
(Continued)

(30) Foreign Application Priority Data

Mar. 30, 2015   (IT) .......................... TO2015A000189

(51) Int. Cl.
  *G06K 7/00*   (2006.01)
  *G01K 7/34*   (2006.01)
  *G01K 7/01*   (2006.01)

(52) U.S. Cl.
  CPC .............. *G01K 7/343* (2013.01); *G01K 7/01* (2013.01); *G01K 7/34* (2013.01)

(58) Field of Classification Search
  USPC .................................................. 374/178, 184
  See application file for complete search history.

(56) References Cited

U.S. PATENT DOCUMENTS

| 5,757,008 A | 5/1998 | Akagawa et al. |
| 8,092,080 B2 | 1/2012 | Mitchell et al. |

(Continued)

FOREIGN PATENT DOCUMENTS

| CN | 101427116 A | 5/2009 |
| CN | 102124419 A | 7/2011 |

(Continued)

OTHER PUBLICATIONS

Cai, Chun-Hua, et al., "High-performance bulk silicon interdigital capacitive temperature sensor based on graphene oxide," Electronics Letters, Mar. 28, 2013, 49(7), 2 pages.
(Continued)

*Primary Examiner* — Mirellys Jagan
(74) *Attorney, Agent, or Firm* — Seed IP Law Group LLP

(57) ABSTRACT

A method of sensing a temperature includes providing a voltage to reverse bias a PN junction of a junction diode. The PN junction has a junction capacitance. The method includes providing a reverse bias voltage change across the PN junction and detecting a value of the junction capacitance in response to the reverse bias voltage change. The value of the junction capacitance is a function of a temperature of the PN junction. An output signal is generated based on the detected junction capacitance, where the output signal indicates a temperature of an environment containing the junction diode.

20 Claims, 3 Drawing Sheets

Related U.S. Application Data division of application No. 14/958,786, filed on Dec. 3, 2015, now Pat. No. 10,317,293.

(56) References Cited

U.S. PATENT DOCUMENTS

| | | | |
|---|---|---|---|
| 2002/0135037 | A1 | 9/2002 | Tomomatsu |
| 2003/0112054 | A1 | 6/2003 | Yamaguchi et al. |
| 2006/0029123 | A1* | 2/2006 | Johnson ............... G01K 15/00 374/178 |
| 2007/0126520 | A1 | 6/2007 | Matsuzuka |
| 2009/0175313 | A1 | 7/2009 | Kordic et al. |
| 2010/0039288 | A1 | 2/2010 | Mitchell et al. |
| 2012/0257650 | A1 | 10/2012 | Chowdhury |
| 2014/0334522 | A1 | 11/2014 | Meiser et al. |

FOREIGN PATENT DOCUMENTS

| | | |
|---|---|---|
| CN | 104157644 A | 11/2014 |
| EP | 1 887 333 A1 | 2/2008 |

OTHER PUBLICATIONS

Hashido, Ryuichi, et al., "A Capacitive Fingerprint Sensor Chip Using Low-Temperature Poly-Si TFTs on a Glass Substrate and a Novel and Unique Sensing Method," IEEE Journal of Solid-State Circuits, 38(2), Feb. 2003, pp. 274-280.

Ma, Hong-Yu, et al., "A Micromachined Silicon Capacitive Temperature Sensor for Radiosonde Applications," Sensors, 2009 IEEE, Oct. 25-28, 2009, pp. 1693-1696.

Ma, HongYu, et al., "Modeling and simulation of a novel capacitive temperature sensor," Solid-State and Integrated-Circuit Technology, ICSICT 2008, 9$^{th}$ International Conference, Oct. 20-23, 2008, pp. 2408-2411.

Tuthill, Mike, "A Switched-Current, Switched-Capacitor Temperature Sensor in 0.6-μm CMOS," IEEE Journal of Solid-State Circuits, 33(7), Jul. 1998, pp. 1117-1122.

Unger, M., et al., "Parameters Governing the Sensor Characteristics of Capacitive Temperature Sensors Built up in LTCC-Technology," Electronics Technology, ISSE 2009, 32$^{nd}$ International Spring Seminar on Electronics Technology, May 13-17, 2009, pp. 1-6.

Yuji, Jun-ichiro, et al., "Temperature and Humidity Sensing Functions of a Capacitive Touch Sensor for Material Discrimination," SICE Annual Conference in Sapporo, Aug. 4-6, 2004, vol. 3, pp. 2652-2655.

* cited by examiner

INTEGRATED ELECTRONIC DEVICE COMPRISING A TEMPERATURE SENSOR AND SENSING METHOD

BACKGROUND

Technical Field

The present disclosure relates to an integrated electronic device comprising a temperature sensor and to the relevant sensing method.

Description of the Related Art

As is known, temperature sensors have a plurality of applications. For instance, they may be stand-alone components, which supply at output the temperature value of an environment. In addition, they may be a component of a more complex system, which includes other elements, the performance whereof varies with temperature. These variations are frequently undesirable so that it is useful to detect the existing temperature and compensate for the performance variations and make them independent of temperature. Also when the performance variation with temperature is the desired effect of the complex system, frequently it is in any case useful to have direct information on the local absolute temperature value.

Temperature sensors are built in very different ways, in particular according to the application and to whether they are of a stand-alone type or they are integrated in a more complex system. In the former case, in fact, frequently no problems of dimensions exist, and simpler but more cumbersome solutions may be used, whereas in the latter case the possibility of an integrated implementation with the other components of the system, in addition to the dimensions and consumption, may be important.

In case of temperature sensors integrated in an electronic circuit, it is known to exploit the variability with temperature of the base-emitter voltage of bipolar transistors. In fact, it is well known that this voltage has a variation of some millivolts per degree centigrade. By detecting the variation of voltage with a sensing circuit and amplifying it, with appropriate algorithms it is possible to determine the local temperature within the electronic circuit. This solution, albeit extremely widely adopted, is not free from disadvantages, due for example to the need of implementing bipolar components for MOS technology circuits and/or to the high consumption of the temperature sensor and the associated components, for example of conditioning and amplification stages associated to the temperature sensor. Furthermore, this solution has the disadvantage of giving rise to high noise, which may be disadvantageous in some applications. On the other hand, the known solutions have consumption levels that are the higher, the lower the level of maximum accepted noise. Not least, this solution does not always solve the problem since the base-emitter voltage read is generally compared with a reference value, generated through a different stage, such as a band-gap circuit, which in turn may vary with temperature. This behavior introduces an error in the output signal, so that the temperature value read may not have the desired precision.

In some known solutions, the sensing circuit comprises a resistive bridge for compensating for the temperature dependence in the reference element or circuit. However, also this solution is not free from disadvantages in so far as it introduces an undesirable consumption level.

More innovative solutions comprise, for example, the use of MEMS (Micro-Electrical-Mechanical System) technologies that enable creation of elements that may undergo mechanical deformation as the temperature varies (see, for example, "A Micromachined Silicon Capacitive Temperature Sensor for Radiosonde Applications" by Hong-Yu Ma, Qing-An Huang, Ming Qin, Tingting Lu, E-ISBN: 978-1-4244-5335-1/09, 2009 IEEE). Other known solutions are based upon the use of new materials (see, for example, "High-performance bulk silicon interdigital capacitive temperature sensor based on graphene oxide" by Chun-Hua Cai and Ming Qin, ELECTRONICS LETTERS, 28 Mar. 2013 Vol. 49 No. 7, ISSN: 0013-5194).

These solutions are, however, difficult to integrate in digital systems and thus not universally applicable.

BRIEF SUMMARY

One aim of the present disclosure is to provide a temperature sensor that overcomes the drawbacks of the prior art.

According to the present disclosure, an integrated electronic device exploits the fact that a reverse biased PN junction has an equivalent capacitance variable in a known way with temperature. This capacitance may be compared with a reference capacitance provided to have a negligible dependence upon temperature. A known sensing circuit, for example a switched capacitor operational amplifier, may then detect the capacitance variation with temperature and output a voltage that varies directly with the capacitance variation.

BRIEF DESCRIPTION OF THE SEVERAL VIEWS OF THE DRAWINGS

For a better understanding of the present disclosure preferred embodiments thereof are now described, purely by way of non-limiting example, with reference to the attached drawings, wherein.

DETAILED DESCRIPTION

Present sensors according to embodiments of the present disclosure exploit the dependence upon temperature of the capacitance of a reverse biased PN-junction diode.

In fact, as is known, the contact potential (or built-in voltage) $V_{bi}$ of a reverse biased PN diode is given by:

$$V_{bi}(T) = \frac{k \cdot T}{q} \cdot \ln\left(\frac{N_A \cdot N_D}{n_i(T)}\right) \quad (1)$$

where K is Boltzmann's constant, T is the temperature in degrees Kelvin, q is the charge of the electron, $N_A$ is the concentration of acceptor atoms, $N_D$ is the concentration of donor atoms, and $n_i(t)$ is the concentration of the intrinsic carriers in the PN diode. In particular, the concentration $n_i$ of the intrinsic carriers depends upon the temperature T on the basis of Eq. (2):

$$n_i^2 = 0.961 \cdot 10^{33} \cdot T^3 \cdot e^{\frac{-E_{Geff}(T)}{k \cdot T}} \quad (2)$$

where $E_{Geff}$ is the energy gap of the material used for integration of the diode.

In a PN diode, by applying a reverse voltage $V_d$ thereto, a charge $Q_j$ is stored on the junction:

$$Q_j(T) = \sqrt{2 \cdot q \cdot \varepsilon_s \frac{N_D \cdot N_A}{N_D + N_A}[V_{bi}(T) - V_d]} \quad (3)$$

where $\varepsilon_S$ is the dielectric constant of the semiconductor. As may be noted, the accumulated charge $Q_j$ depends upon the temperature through the contact potential $V_{bi}$, as well as upon the reverse voltage $V_d$.

The junction capacitance $C_j$ of the diode is thus:

$$C_j(T, Vd) = A_D \cdot \frac{dQ_j(T, V)}{dV} = A_D \cdot \frac{Q_j(T, Vd) - Q_j(T, Vd - dV)}{dV} \quad (4)$$

where A is the area of the PN junction.

Figure 1:
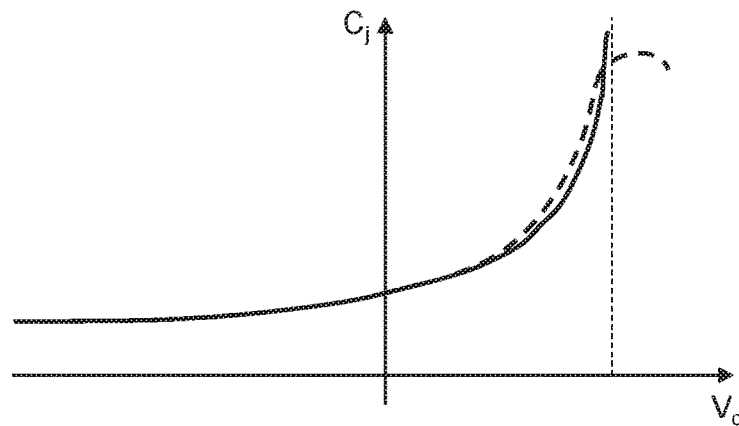
FIG. 1 shows the plot of the junction capacitance $C_j$ of a junction diode as a function of the voltage applied $V_d$.
Figure 2:
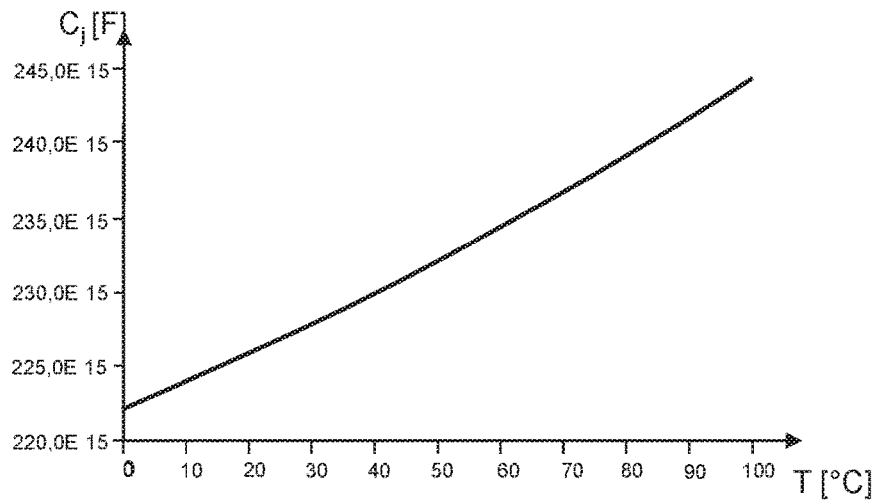
FIG. 2 shows the variation of junction capacitance $C_j$ of a junction diode as a function of temperature.

In practice, a PN diode formed in a silicon substrate has a junction capacitance depending both upon the biasing voltage and the temperature, as illustrated respectively in FIG. 1 (with a solid line) and in FIG. 2, calculated respectively at constant temperature (T=25° C.) and at constant reverse biasing voltage ($V_r$=0.625V). FIG. 1 also shows with a dashed line the plot of the junction capacitance determined using more accurate calculations.

In particular, as may be noted from FIG. 2, in temperature ranges wherein integrated circuits normally operate, the junction capacitance $C_j$ has an approximately linear plot as a function of temperature. Consequently, to a first approximation, the reading of the junction capacitance $C_j$ of a reverse biased PN diode has a relation of direct proportionality with the local temperature, and reading of the junction capacitance and/or of its variation supplies direct information on the temperature or on the temperature variation.

Figure 3:
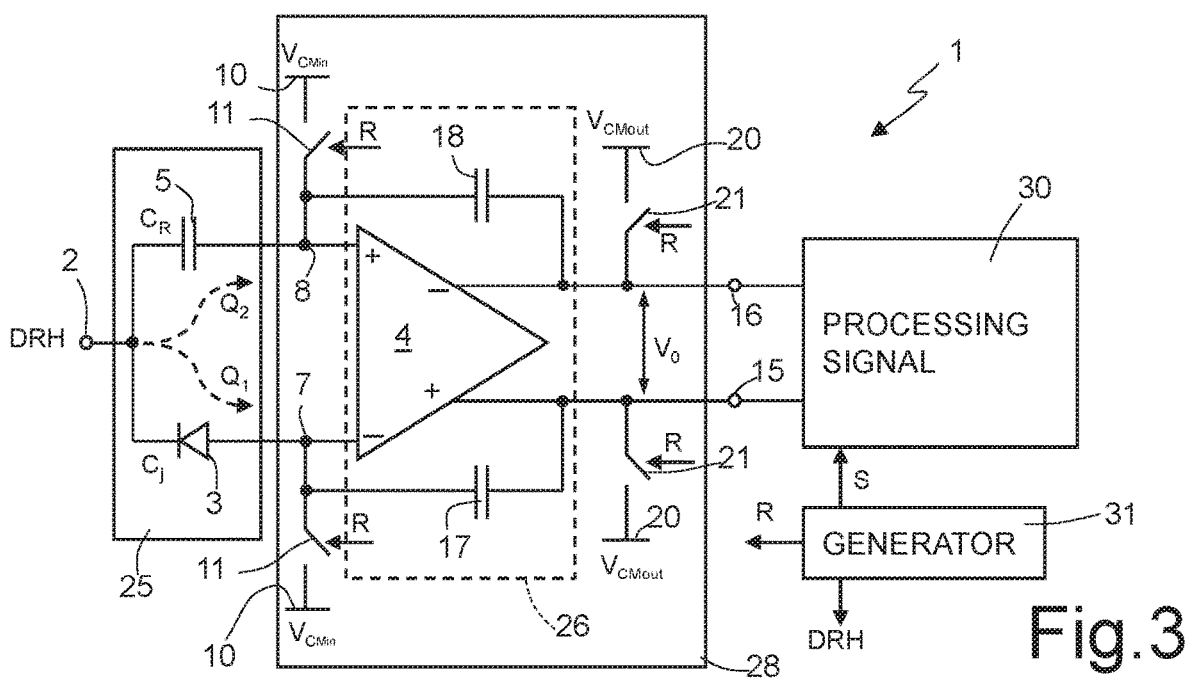
FIG. 3 shows a simplified circuit diagram of a present device according to a first embodiment of the present disclosure.

FIG. 3 shows a temperature sensor 1 that exploits the principle explained above.

In detail, the temperature sensor 1 comprises a sensor input 2 supplied with a sensor excitation signal, i.e., the timed biasing voltage DRH. A sensing diode 3, of a PN-junction type, has its cathode coupled to the sensor input 2 and its anode coupled to an inverting input 7 of an operational amplifier 4. A reference capacitor 5, having a reference capacitance $C_R$, is coupled between the sensor input 2 and a non-inverting input 8 of the operational amplifier 4.

The reference capacitance $C_R$ is chosen so as to have the same value as the junction capacitance $C_j$ at room temperature.

The inputs 7, 8 of the operational amplifier 4 are both coupled to a first reference potential line 10, set at a first common mode potential $V_{CMin}$, through a respective input switch 11. The input switches 11 are controlled by a same reset signal R.

The operational amplifier 4 is of a fully differential type, has a pair of outputs 15, 16 and has a capacitive feedback formed by a first and a second feedback capacitors 17, 18, which have the same feedback capacitance $C_i$. In detail, the first feedback capacitor 17 is coupled between the first output 15 and the inverting input 7, and the second feedback capacitor 18 is coupled between the second output 16 and the non-inverting input 8 of the operational amplifier 4. The outputs 15, 16 of the operational amplifier 4 are further coupled to a second reference potential line 20, set at a second common mode potential $V_{CMout}$, through a respective output switch 21. The output switches 21 are controlled by the reset signal R.

A timed biasing voltage DRH is supplied on the input 2 and switches between a low value (for example, 0.625 V) and a high value $V_{DRH}$ (for example, 1.25V). In particular, the low value is in any case positive for keeping the sensing diode 3 (which has its anode coupled to the virtual ground on the inverting input 7 of the operational amplifier 4) reverse biased in all the sensing phases, and the high value is chosen for generating a voltage step ΔV of a preset value, as explained in detail hereinafter.

In practice, in the temperature sensor 1 of FIG. 3, the sensing diode 3 and the reference capacitor 5 form a sensing element 25 and the operational amplifier 4, with the capacitive feedback, forms a switched capacitor differential amplifier stage of a known type and widely used, for example, in reading of MEMS structures.

The operational amplifier 4 and the relevant feedback network 17, 18, 11, 21 may be incorporated in an ASIC (Application Specific Integrated Circuit) 28.

The sensing diode 3 and the reference capacitor 5 may be formed in a semiconductor material chip, as described in greater detail with reference to FIG. 8.

The outputs 15 and 16 of the operational amplifier 4 are coupled to a processing stage 30, generally external to the temperature sensor 1 but possibly also integrated in the ASIC. The processing stage 30 may comprise circuits for amplification of the output voltage $V_o$ and for analog-to-digital conversion.

Finally, a timing stage 31 generates biasing/timing signals for the temperature sensor 1 and for the processing stage 30, such as the reset signal R, the timed biasing voltage DRH, and a reading acquisition signal S for the processing stage 30.

Sensing of the output voltage $V_o$ of the operational amplifier 4 is obtained according to the timing, illustrated in FIG. 4, which includes the succession of a reset phase and a sensing phase that follow each other in an acquisition period $T_1$ equal to one half of a sensing period $T_2 = 2 \cdot T_1$, as described in detail hereinafter. In particular, the reset signal R and the reading acquisition signal S have the same period, but different duty cycle. For this reason, hereinafter the sensing period $T_2$ is considered as being divided into two half periods $T_{11}$ and $T_{12}$, corresponding to two successive periods of the acquisition period $T_1$.

Reset Phase—First Half Period $T_{11}$

At instant to the reset signal R switches to the high state, causing the input switches 11 and of the output switches 21 to switch off. Consequently, the inputs 7, 8 of the operational amplifier 4 are coupled to the first common mode potential $V_{CMin}$ (for example, 0.625 V, i.e., to the low value of the timed biasing voltage DRH), and the outputs 15, 16 of the operational amplifier 4 are coupled to the second common mode potential $V_{CMout}$ (for example, 1 V), thus resetting the operational amplifier 4.

In this step, the timed biasing voltage DRH (for example, 0.625 V) is low, as likewise is the reading acquisition signal S. The output voltage $V_o$ is thus not acquired by the signal processing stage 30.

Next, at instant $t_1$, the reset signal R switches to the low state, causing opening of the input and output switches 11, 21 and causing the input nodes 7, 8 and output nodes 15, 16 of the operational amplifier 4 to be independent. The timed biasing voltage DRH is low, as is the reading acquisition signal S.

The step $t_1$-$t_2$ may be adopted in case of use of the correlated double sampling (CDS) technique. During this step, in fact, with the technique referred to, offset sampling is carried out, which may then be subtracted during the sensing phase. In this way, it is possible to reduce the offset.
Sensing Phase—First Half Period $T_{11}$ At the instant $t_2$, the timed biasing voltage DRH has a rising edge and reaches a value that reverse biases the sensing diode 3, for example, at 1.25 V. In this condition, neglecting possible losses, a reverse current flows in the sensing diode 3. Further, a reference current flows in the reference capacitor 5. There is thus a charge displacement $Q_1$ (according to the law in Eq. (3), where $V_d$ is here the timed biasing voltage DRH) from the sensing diode 3 to the operational amplifier 4 and a charge displacement $Q_2$ (according to the law Q=C/ΔV, where ΔV is the step of the timed biasing voltage DRH) from the reference capacitor 5 to the operational amplifier 4. As a result of the half bridge configuration of the sensing element 25 and of the feedback network of the amplifier 26, the latter is traversed by a differential charge $Q_2$-$Q_1$ that is a function of the amplitude of the step ΔV of the timed biasing voltage DRH, of the capacitance difference ΔC (difference between the junction capacitance $C_j$ of the sensing diode, and the capacitance $C_R$ of the reference capacitor 5), and of the capacitances $C_i$ of the feedback capacitors 17, 18.

Consequently, between the outputs 15 and 16 of the operational amplifier 4 there is an output voltage $V_o$ $$V_o(t) \propto \frac{\Delta C}{C_i} \Delta V \tag{5}$$

which is acquired by the signal processing stage by virtue of the high value of reading acquisition signal S.

In this connection, since the time plot of the output voltage $V_o$ has a transient step, acquisition of the output voltage $V_o$ is made during the subsequent steady state step regime, and the involved time is calculated taking into account the bandwidth of the operational amplifier 4.

This step terminates at instant $t_3$, where a new period $T_1$ of the reading acquisition signal S and of the reset signal R and the second half period $T_{12}$ of the sensing signal DRH start.
Reset Phase—Second Half Period $T_{12}$ At instant $t_3$, the reset signal R switches to high, and the reading acquisition signal S switches to low. The operational amplifier 4 is thus reset again, in a way generally similar to what described for the reset phase of the first half period $T_{11}$, with the only difference that, now, the timed biasing voltage DRH is high. This value does not, however, affect the reset phase since, as before, the operational amplifier 4 is reset, and the output voltage $V_o$ is not acquired by the signal processing stage 30.

At instant $t_4$, the reset signal R switches again to low.
Sensing Phase—Second Half Period $T_{12}$ At the instant $t_5$, the timed biasing voltage DRH has a falling edge, thus causing a charge displacement opposite to that of the sensing phase in the first half period. Consequently, the output voltage $V_o$ has a value $$V_o(t) \propto \frac{\Delta C}{C_i} \Delta V \tag{6}$$

with a opposite sign to Eq. (5), since in this half period $T_{12}$ the step ΔV of the timed biasing voltage DRH is a down step and is equal to $-V_{DRH}$.

Also in this step, the value of the output voltage $V_o$ is acquired from the signal processing stage 30 thanks to the high value of the reading acquisition signal S. The signal processing stage 30 thus modifies the sign of the output voltage $V_o$ in one of the two half periods $T_{11}$ and $T_{12}$, in a way synchronized with the sensing period $T_2$.

This step terminates at instant $t_3$, where a new period $T_1$ of the reading acquisition signal S and of the reset signal R starts, as well as a new period $T_2$ of the sensing signal DRH.

The solution illustrated in FIG. 3 thus enables detection of the absolute temperature in the area of the sensing diode 3 on the basis of the variation of its reverse junction capacitance, using a simple voltage biased capacitive bridge. This solution presents the advantage of having a zero current consumption and a very simple structure, which does not require use of MEMS capacitive structures.

However, the sensing diode 3 intrinsically presents a current leakage that, in some situations, may reduce reading precision in an undesirable way.

In fact, the aforesaid current leakage of the sensing diode 3 determines a variation of the charge $Q_1$. In fact, during the sensing phase, the sensing diode 3 undergoes a displacement of charge equal to $Q_1$-$Q_L$, where $Q_L$ is the charge due to the leakage current. A more precise approximation of the output voltage $V_o$ is thus the following:

$$V_o(t) \propto \frac{\Delta C}{C_i} \Delta V + I_L \cdot C_i \cdot \frac{T_1}{2} \tag{7}$$

where $I_L$ is the leakage current of the sensing diode 3.

Figure 5:
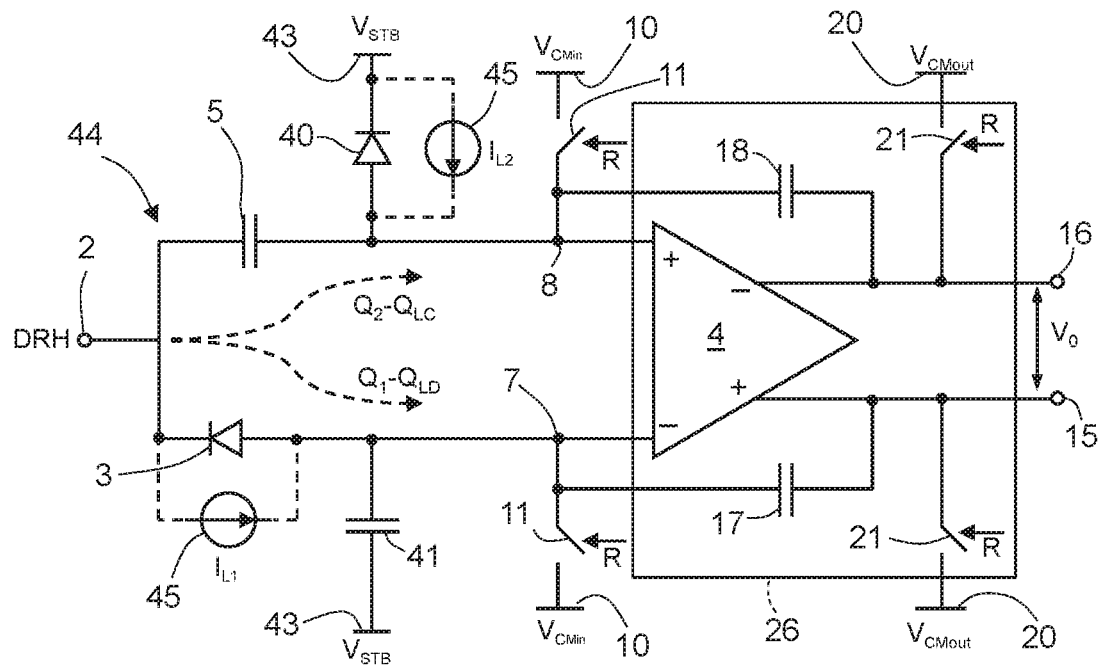
FIG. 5 shows a simplified circuit diagram of a present device according to a second embodiment of the present disclosure.

FIG. 5 shows an embodiment wherein the leakage current $I_L$ of the sensing diode 3 is compensated.

In particular, the temperature sensor of FIG. 5 has the same basic structure as the temperature sensor of FIG. 3, where a compensation diode 40 and a symmetry capacitor 41, having a capacitance equal to the capacitance $C_R$ of the reference capacitor 5, have been added. The elements in common with those of FIG. 3 are thus designated by the same reference numbers.

In detail, the compensation diode 40 has its anode coupled to the non-inverting input 8 of the operational amplifier 4 and its cathode coupled to a third reference potential line 43, set at a non-constant biasing potential $V_{STB}$, and the symmetry capacitor 41 is coupled between the inverting input 7 of the operational amplifier 4 and the third reference potential line 43.

The biasing potential $V_{STB}$ switches between two positive values, for example between 0 V and 2.5 V, to be surely higher than the potential on the inputs 7 and 8 of the operational amplifier 4 and keep the compensation diode 40 reverse biased.

Two current generators 45 are also illustrated in FIG. 5 and represent the leakage currents $I_L$ of the sensing diode 3 and of the compensation diode 40. In practice, the sensing diode 3, the reference capacitor 5, the compensation diode 40, and the symmetry capacitor 41 form a capacitive bridge 44.

Figure 4:
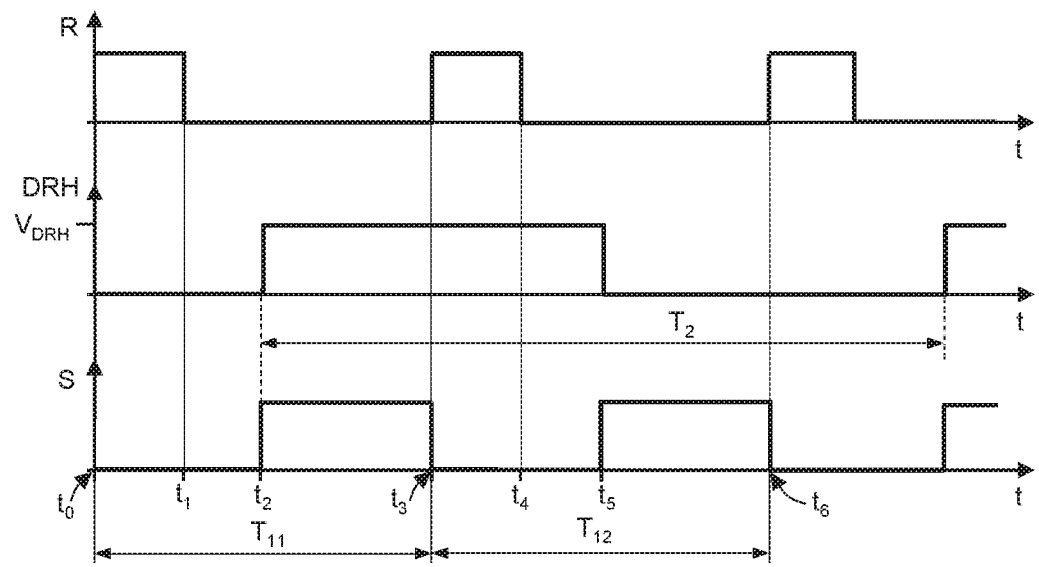
FIG. 4 shows the plot of electrical signals in the circuit of FIG. 3.
Figure 6:
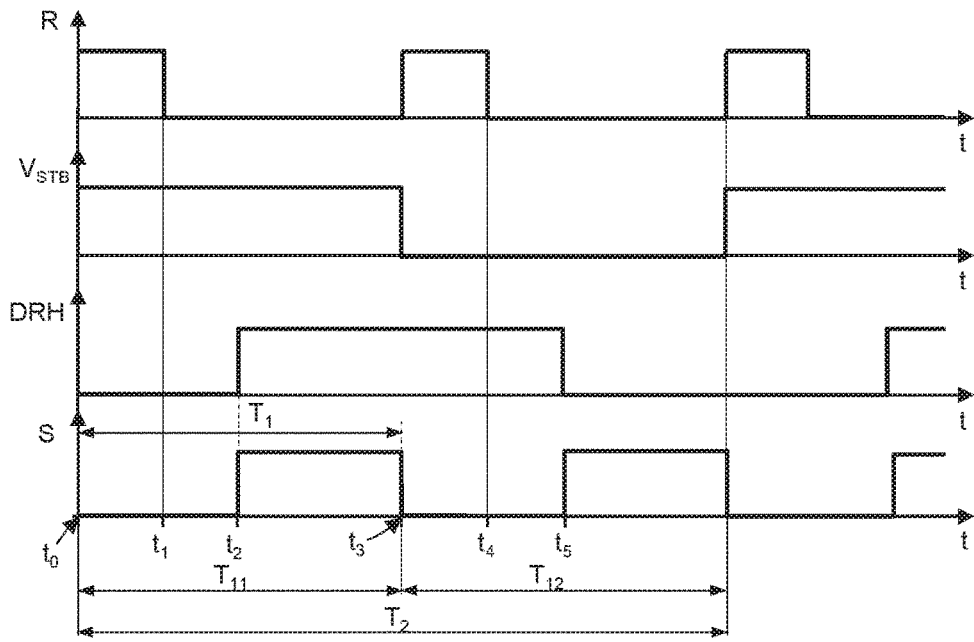
FIG. 6 shows the plot of electrical signals in the circuit of FIG. 5.

As illustrated in the timing diagram of FIG. 6, where the signals R, DRH, S have the same meaning as in FIG. 4, and the switching instants $t_0$–$t_5$ correspond to the above, the biasing potential $V_{STB}$ switches at the rising edge of the reset signal R, thus at frequency $f_2=1/T_2$ equal to one half of the frequency ($f_1=1/T_1$) of the reset signal R and equal to the frequency of the sensing signal DRH. It follows that the effects of switching of the biasing potential $V_{STB}$ do not affect the operational amplifier 4 since, during the reset phase, the inputs 7, 8 of the latter are coupled to the first common mode potential $V_{CMin}$. Furthermore, the biasing potential $V_{STB}$ has the same sign as the timed biasing voltage DRH during the sensing phase; namely, it is positive with respect to the virtual ground on the inputs 7 and 8 of the operational amplifier 4 for keeping the compensation diode 40 reverse biased in all the sensing phases and to have a voltage step $\Delta V$ equal to the step of the sensing signal DHR in order to keep the compensation diode 40 in the same operating conditions as the sensing diode 3.

In this way, during the sensing phase (both in the first half period $T_{11}$ and in the second half period $T_{12}$ of the sensing signal DRH), the feedback capacitors 17 and 18 are traversed by the following currents:

a current due to the differential charge generated by the switching edge of the timed biasing voltage DRH and depending on the difference of capacitance in the capacitive bridge 44;

a leakage current $I_{L1}$ in the sensing diode 3; and a leakage current $I_{L2}$ in the compensation diode 40.

Consequently, the output voltage $V_o$ of the temperature sensor of FIG. 5 may be expressed as follows:

$$V_o(t) \propto \frac{\Delta C}{C_i} \Delta V + I_{L1} \cdot C_i \cdot \frac{T_1}{2} - I_{L2} \cdot C_i \cdot \frac{T_1}{2} \qquad (8)$$

By manufacturing the compensation diode 40 in the same way and with the same parameters as the sensing diode 3, due also to the same reverse biasing of the diodes 3 and 40, they generate leakage currents $I_{L1}$ and $I_{L2}$ that are the same so that in Eq. (8) the two contributions of the leakage currents $I_{L1}$ and $I_{L2}$ cancel out, and the output voltage $V_o$ may be expressed again by Eq. (6).

Figure 7:
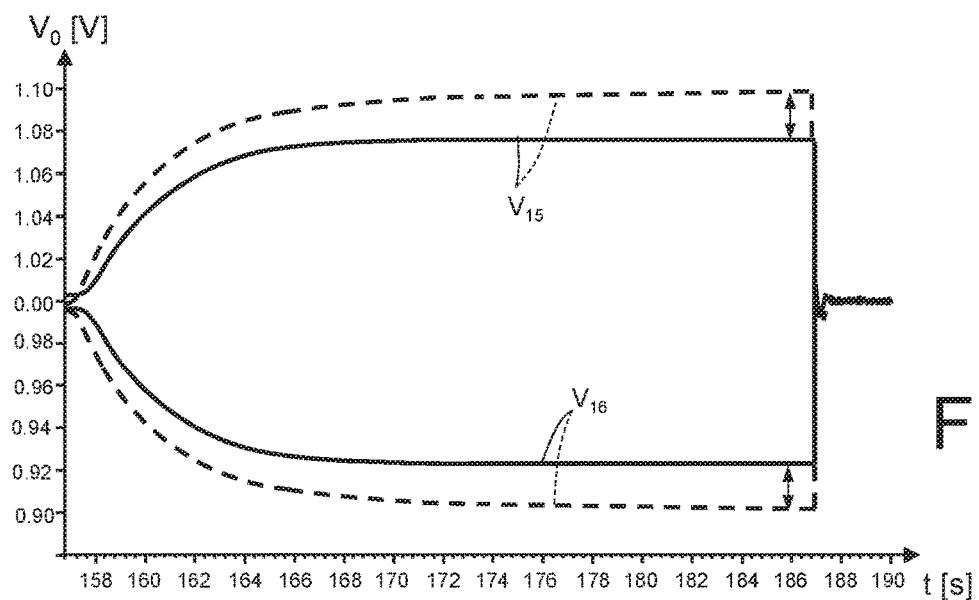
FIG. 7 shows the plot of the output voltage $V_o$ of the circuit of FIG. 5.

The effect of cancelling out of the leakage currents in the sensing diode 3 is visible in the simulation of FIG. 7, which reproduces the voltages on the non-inverting output 15 and on the inverting output 16 of the operational amplifier 4 in case of compensation of the leakage current of the sensing diode 3 (solid lines) and in the case without compensation (dashed lines).

As may be noted, the output voltage $V_o$ of the operational amplifier 4 without compensation has a reading error proportional both to the leakage current and to the integration time. Instead, the output voltage $V_o$ with compensation, after a transient, is insensitive to the above parameters.

Figure 8:
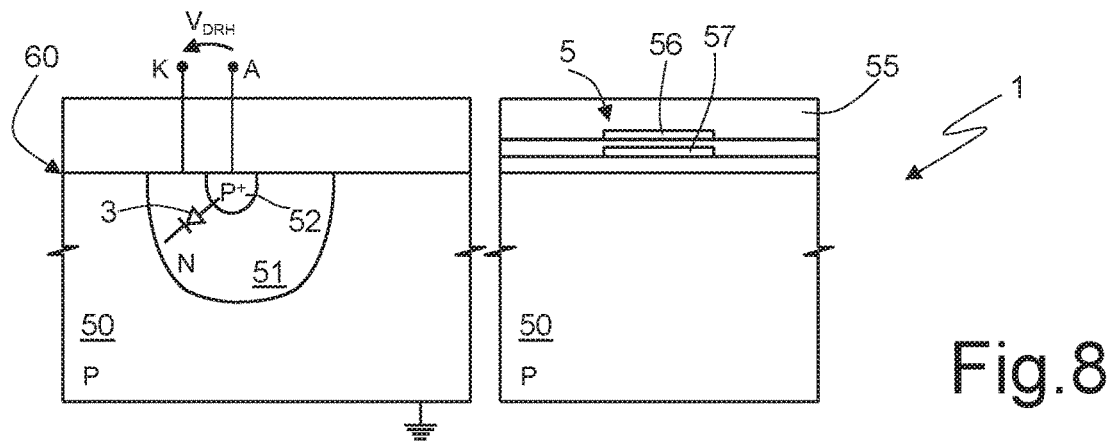
FIG. 8 shows a possible implementation of a temperature sensor according to the embodiments of FIGS. 3 and 5.

FIG. 8 shows a possible implementation of the compensation diode 40 and of the symmetry capacitor 41. In the example illustrated, the temperature sensor 1 is formed in a chip 60 of semiconductor material, such as silicon, having a substrate 50 of a P type, accommodates a well 51 of an N type, which forms the cathode K of the compensation diode 40. The well 51 in turn accommodates a tap 52, of a P type, forming the anode A of the compensation diode 40.

An insulating layer 55 extends over the substrate 50 and accommodates two metal regions 56, 57, arranged on top of each other and formed, for example, in two different metallization levels of the chip 60. The metal regions 56, 57 form, together with the portion of the insulating layer 55 arranged in between, the reference capacitor 5.

The compensation diode 40 and the symmetry capacitor 41 may be formed in a similar way.

The described temperature sensor comprises only a few simple components of a capacitive type (sensing diode 3, reference capacitor 5, possibly a capacitive bridge 44) that may easily be integrated and require only a small area, which cooperate with a sensing network (operational amplifier 4 and corresponding feedback network) that may be manufactured using standard CMOS technology. The sensor has a zero d.c. biasing voltage, and thus a low current consumption.

The temperature sensor 1 may be compensated with respect to the current leakages by a few simple components (compensation diode 40, symmetry capacitor 41), thus supplying a particularly precise output.

Finally, it is clear that modifications and variations may be made to the embodiments of a temperature sensor described and illustrated herein, without thereby departing from the scope of the present disclosure. In particular, the switched capacitor differential amplifier 26 may be replaced by another type of sensing circuit, and/or be formed in a different way from what illustrated, for example be formed as a non-fully differential amplifier.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature sensor, comprising:
a first input configured to receive a first electrical signal;
a junction diode including a cathode and an anode, the cathode being electrically coupled to the first input;
a reference capacitor electrically coupled to the first input;
an operational amplifier including an inverting input, a non-inverting input, a non-inverting output, and an inverting output, the inverting input being electrically coupled to the anode, the non-inverting input being electrically coupled to the reference capacitor;

a first feedback capacitor electrically coupled to the inverting input and the non-inverting output; and
a second feedback capacitor electrically coupled to the non-inverting input and the inverting output.

2. The temperature sensor of claim 1, wherein the junction diode has a junction capacitance at room temperature, and the reference capacitor has a capacitance of the same value as the junction capacitance at room temperature.

3. The temperature sensor of claim 1, wherein the first feedback capacitor and the second feedback capacitor have the same capacitance.

4. The temperature sensor of claim 1, further comprising:
a compensation diode including a cathode and an anode, the anode of the compensation diode being electrically coupled to the non-inverting input; and
a symmetry capacitor electrically coupled to the inverting input.

5. The temperature sensor of claim 1, further comprising:
a second input configured to receive a second electrical signal;
a first switch electrically coupled to the second input and the inverting input;
a third input configured to receive the second electrical signal;
a second switch electrically coupled to the third input and the non-inverting input;
a fourth input configured to receive a third electrical signal;
a third switch electrically coupled to the fourth input and the non-inverting output;
a fifth input configured to receive the third electrical signal; and
a fourth switch electrically coupled to the fifth input and the inverting output.

6. The temperature sensor of claim 5, further comprising:
a timing stage configured to provide the first electrical signal to the first input, and control signals to the first, second, third, and fourth switches.

7. The temperature sensor of claim 1, further comprising:
a processing stage electrically coupled to the non-inverting output and the inverting output, the processing stage including at least one of an amplifier or an analog-to-digital converter.

8. The temperature sensor of claim 7, further comprising:
a timing stage configured to provide the first electrical signal to the first input, and a reading acquisition signal to the processing stage.

9. A device, comprising:
a first diode including a cathode and an anode, the first diode being a junction diode having a capacitance that varies based on temperature;
a first capacitor electrically coupled to the cathode of the first diode;
an operational amplifier including an inverting input, a non-inverting input, a non-inverting output, and an inverting output, the inverting input being electrically coupled to the anode of the first diode, the non-inverting input being electrically coupled to the first capacitor;
a second capacitor electrically coupled to the inverting input and the non-inverting output; and
a third capacitor electrically coupled to the non-inverting input and the inverting output.

10. The device of claim 9, further comprising:
a first input configured to receive a first electrical signal, the cathode of the first diode and the first capacitor being electrically coupled to the first input;
a second input configured to receive a second electrical signal;
a first switch electrically coupled to the second input and the inverting input;
a third input configured to receive the second electrical signal;
a second switch electrically coupled to the third input and the non-inverting input;
a fourth input configured to receive a third electrical signal;
a third switch electrically coupled to the fourth input and the non-inverting output;
a fifth input configured to receive the third electrical signal; and
a fourth switch electrically coupled to the fifth input and the inverting output.

11. The device of claim 9, wherein the first diode has junction capacitance at room temperature, and the first capacitor has a capacitance of the same value as the junction capacitance at room temperature.

12. The device of claim 9, wherein the second capacitor and the third capacitor have the same capacitance.

13. The device of claim 9, further comprising:
a second diode having a cathode and an anode, the anode of the second diode being electrically coupled to the first capacitor and the non-inverting input; and
a fourth capacitor electrically coupled to the anode of the first diode and the inverting input.

14. The device of claim 13, further comprising:
a first input configured to receive a first electrical signal, the cathode of the first diode and the first capacitor being electrically coupled to the first input;
a second input configured to receive a second electrical signal, the cathode of the second diode being electrically coupled to the second input; and
a third input configured to receive the second electrical signal, the fourth capacitor being electrically coupled to the third input.

15. The device of claim 13, wherein the first capacitor and the fourth capacitor have the same capacitance.

16. A device, comprising:
a junction diode having a first capacitance that is a function of temperature;
a reference capacitor having a second capacitance that is substantially independent of temperature; and
circuitry coupled to the junction diode and the reference capacitor, the circuitry configured to generate an output signal that indicates a temperature of the junction diode, the output signal being generated based on a comparison between the first capacitance and the second capacitance.

17. The device of claim 16, wherein the reference capacitor has a capacitance that is equal to a junction capacitance of the junction diode at room temperature.

18. The device of claim 16, wherein the circuitry includes:
an operational amplifier including an inverting input, a non-inverting input, a non-inverting output, and an inverting output, the inverting input being electrically coupled to the anode of the junction diode, the non-inverting input being electrically coupled to the reference capacitor;
a first feedback capacitor electrically coupled to the inverting input and the non-inverting output; and
a second feedback capacitor electrically coupled to the non-inverting input and the inverting output, the first feedback capacitor and the second feedback capacitor having the same capacitance.

19. The device of claim 18, wherein the circuitry includes:
a compensation diode having a cathode and an anode, the anode of the compensation diode being electrically coupled to the reference capacitor and the non-inverting input; and
a symmetry capacitor electrically coupled to the anode of the junction diode and the inverting input.

20. The device of claim 19, wherein the reference capacitor and the symmetry capacitor have the same capacitance.

* * * * *